United States Patent
Bastide et al.

(10) Patent No.: US 9,401,886 B2
(45) Date of Patent: Jul. 26, 2016

(54) PREVENTING PERSONAL INFORMATION FROM BEING POSTED TO AN INTERNET

(75) Inventors: Paul Roger Bastide, Boxford, MA (US); Matthew E. Broomhall, South Burlington, VT (US); Robert Edward Loredo, North Miami Beach, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 289 days.

(21) Appl. No.: 13/483,336

(22) Filed: May 30, 2012

(65) Prior Publication Data

US 2013/0326020 A1    Dec. 5, 2013

(51) Int. Cl.
| | |
|---|---|
| *G06F 15/16* | (2006.01) |
| *H04L 12/58* | (2006.01) |
| *G06F 21/62* | (2013.01) |
| *H04L 29/06* | (2006.01) |
| *G06F 17/30* | (2006.01) |
| *H04L 29/08* | (2006.01) |

(52) U.S. Cl.
CPC .......... *H04L 51/32* (2013.01); *G06F 17/30876* (2013.01); *G06F 21/6245* (2013.01); *H04L 63/102* (2013.01); *H04L 63/20* (2013.01); *H04L 67/10* (2013.01)

(58) Field of Classification Search
CPC ....................................................... G06F 15/16
USPC ................................................ 709/218–219
See application file for complete search history.

(56) References Cited

U.S. PATENT DOCUMENTS

| | | | |
|---|---|---|---|
| 7,231,428 B2 | 6/2007 | Teague | |
| 7,257,546 B2* | 8/2007 | Ebrahimi et al. | 705/14.73 |
| 7,975,150 B1* | 7/2011 | Lillibridge et al. | 713/193 |
| 8,166,104 B2* | 4/2012 | Shein et al. | 709/203 |
| 8,176,163 B1* | 5/2012 | Fikes et al. | 709/223 |
| 8,364,720 B2* | 1/2013 | Levy | 707/803 |
| 8,381,276 B2* | 2/2013 | Costinsky | H04L 67/02 726/6 |

(Continued)

FOREIGN PATENT DOCUMENTS

| | | | |
|---|---|---|---|
| WO | WO 0165442 A1 * | 9/2001 | |
| WO | WO 2006110111 A1 * | 10/2006 | 707/E17.01 |

OTHER PUBLICATIONS

Strip Signature and/or Mask Personal Info from Email Replies to Thread, AMAIER, Feb. 28, 2011, community.jivesoftware.com.

*Primary Examiner* — Hua Fan
(74) *Attorney, Agent, or Firm* — Steven L. Nichols; Pabian Vancott (57) ABSTRACT

A method of preventing personal information from being posted to an internet, comprising determining whether text within a post includes a pre-identified text pattern indicative of a first user's personal information, replacing any identified personal information with a number of trackback identifiers, and posting the text to the internet with the post including the number of trackback identifiers. A system for replacing personal information in an interact post with a number of trackback identifiers, the system comprising a processor, a discovery module, and a trackback generation module, in which the discovery module, when executed on the processor, searches through text within a post for any personal information associated with a first user, and in which the trackback generation module, when executed on the processor, replaces any identified personal information with the number of trackback identifiers before the information is posted to the internet.

20 Claims, 5 Drawing Sheets

(56) References Cited

U.S. PATENT DOCUMENTS

| | | | |
|---|---|---|---|
| 8,620,866 B2* | 12/2013 | Fitzpatrick et al. | 707/636 |
| 8,898,482 B2* | 11/2014 | Templin et al. | 713/193 |
| 2005/0160271 A9* | 7/2005 | Brundage et al. | 713/176 |
| 2006/0136985 A1* | 6/2006 | Ashley et al. | 726/1 |
| 2007/0209062 A1* | 9/2007 | Takahashi et al. | 726/3 |
| 2007/0239528 A1* | 10/2007 | Xie et al. | 705/14 |
| 2008/0263175 A1* | 10/2008 | Naono et al. | 709/217 |
| 2009/0144829 A1 | 6/2009 | Grigsby et al. | |
| 2011/0225200 A1 | 9/2011 | Danis et al. | |
| 2012/0124372 A1* | 5/2012 | Dilley et al. | 713/162 |

\* cited by examiner

PREVENTING PERSONAL INFORMATION FROM BEING POSTED TO AN INTERNET

BACKGROUND

Accessing personal information has been a convenient way for would-be criminals to cause harm to others' reputation, financial status, and general well being. Recently criminals have looked to the Internet as a way of obtaining this information relatively easier than before. As such, those users who access the internet are always, or at least should be, cautious of what information they release into the public domain. A realization that once the information is placed on the Internet and is then out of the users' control results in those users taking specific care not to divulge information such as their name, address, phone number, date of birth, and social security number. In some circumstances, if the information is shared with others on the Internet, that information may be shared again by others any number of times compounding the potential that that released information would be used inappropriately. Even further, personal information may be shared via social networking sites in which that personal information may be unintentionally taken outside of a network of friends after a member of the network appends a status update with personal information. Still further, one person in a network may divulge information about another user within a network to which that user did not want that information to be divulged. In that case, even the initial decision to release the personal information was not within the control of the person to which that personal information belonged.

SUMMARY

According to one embodiment the present specification describes a method of preventing personal information from being posted to an internet, comprising determining whether text within a post includes a pre-identified text pattern indicative of a first user's personal information, replacing any identified personal information with a number of trackback identifiers, and posting the text to the internet with the post including the number of trackback identifiers. Additionally, the present specification describes a system for replacing personal information in an internet post with a number of trackback identifiers, the system comprising a processor, a discovery module, and a trackback generation module, in which the discovery module, when executed on the processor, searches through text within a post for any personal information associated with a first user, and in which the trackback generation module, when executed on the processor, replaces any identified personal information with the number of trackback identifiers before the information is posted to the internet.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

The present specification therefore describes a method of replacing personal information on the internet with a trackback identifier as a proxy for the original text posted on the Internet, an internet, or an extranet. The system may detect expressions placed within the text as being personal information related to any user of, for example, a network of users. This information may be replaced by a trackback generation module with proxy text indicative of the original text, but which will prevent unauthorized users from directly receiving the personal information. Various types of personal information may be detected by the system such as physical home addresses, internet addresses, phone numbers, social security numbers, dates of birth, and uniform resource locators (URLs) to name a few.

Prior attempts have been made to completely mask or delete information in the post. However, this prevents any user from being able to use the information at all. Indeed, masking of the information may prevent those who would legitimately use the information from receiving that information. Additionally, because others may have access to or know the personal information, the owner of the personal information may not be able to prevent those other users from simply posting it to the internet.

Aspects of the present specification may be embodied as a system, method or computer program product. Accordingly, aspects of the present specification may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present specification may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present specification are described below with reference to flowchart illustrations and/or block diagrams of methods, apparatus (systems) and computer program products according to embodiments of the specification. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the present specification and in the appended claims the term "personal information" is meant to be understood broadly as any information that may be used to uniquely identify, contact, or locate a single person or information uniquely associated with an individual that truly allow access to benefits or services meant for viewing by that individual. Some examples of personal information may include, but is in now way limited to, a telephone number, a home address, an internet address, a URL, a social security number, an email address, a name, a date of birth, a location of birth, a maiden name, and a number uniquely associated with a service such as a insurance number, among other.

In the present specification and in the appended claims the term "post" is meant to be understood broadly as an upload of any information to a network such as the Internet, an internet, or and extranet. Some examples of a post may include a status update on a social networking site, a post on a blogger or forum, or the addition of content on a website.

In the present specification and in the appended claims the terms "internet" or "the Internet" are meant to be understood broadly as any network under which two or more computers are communicatively coupled to each other and on which each computer may share information with each other. Some examples of an internet may include and extranet and the Internet.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Figure 1:
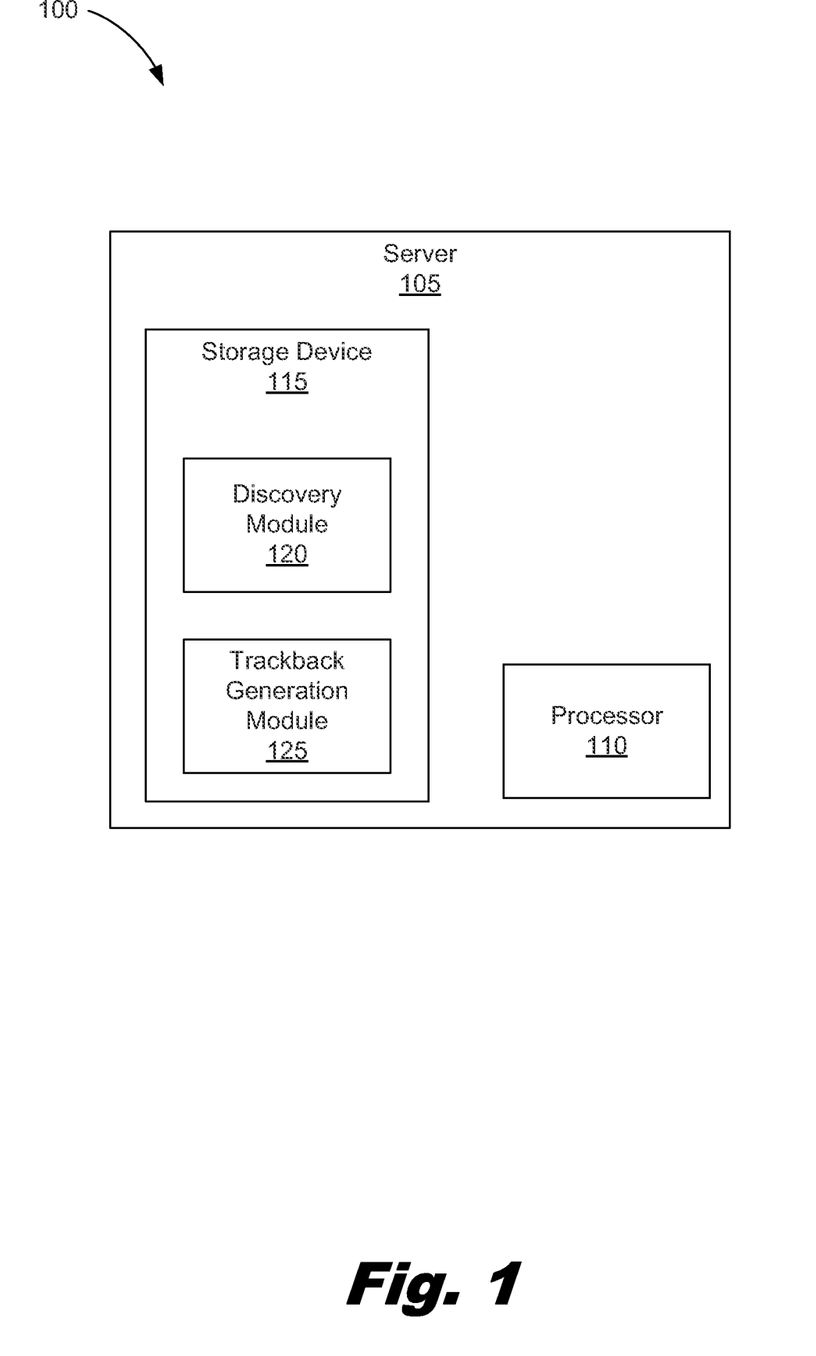
FIG. 1 is a block diagram showing a system for providing a trackback identifier to internet users according to one example of principles described herein.

FIG. 1 is a block diagram showing a system for providing a trackback identifier to internet users according to one example of principles described herein. The system (100). The system (100) may include a server (105) comprising a processor (110) and a storage device (115). The storage device may be any type of storage device (115) including any volatile or non-volatile storage device as described above. The storage device (115) may include a discovery module (120) and a trackback generation module (125).

The discovery module (120) may comprise computer program code which, when executed by the processor (110), searches through text intended to be uploaded to a website for any personal information. In one example, the discovery module (120) may use expressions which match phone number patterns, URL patterns, physical address patterns, email address patterns, and internet address patterns among others. The discovery module (120) may be prompted to search through the post once a request has been received to post the information to the website.

If the discovery module (120) discovers personal information in the information to be posted to the website, the trackback generation module may replace the personal information with a trackback identifier. The trackback identifier may be presented in many forms including a proxy URL, proxy phone number, or a link which may redirect a user to a confirmation request for the information. These features will be discussed in more detail below.

Figure 2:
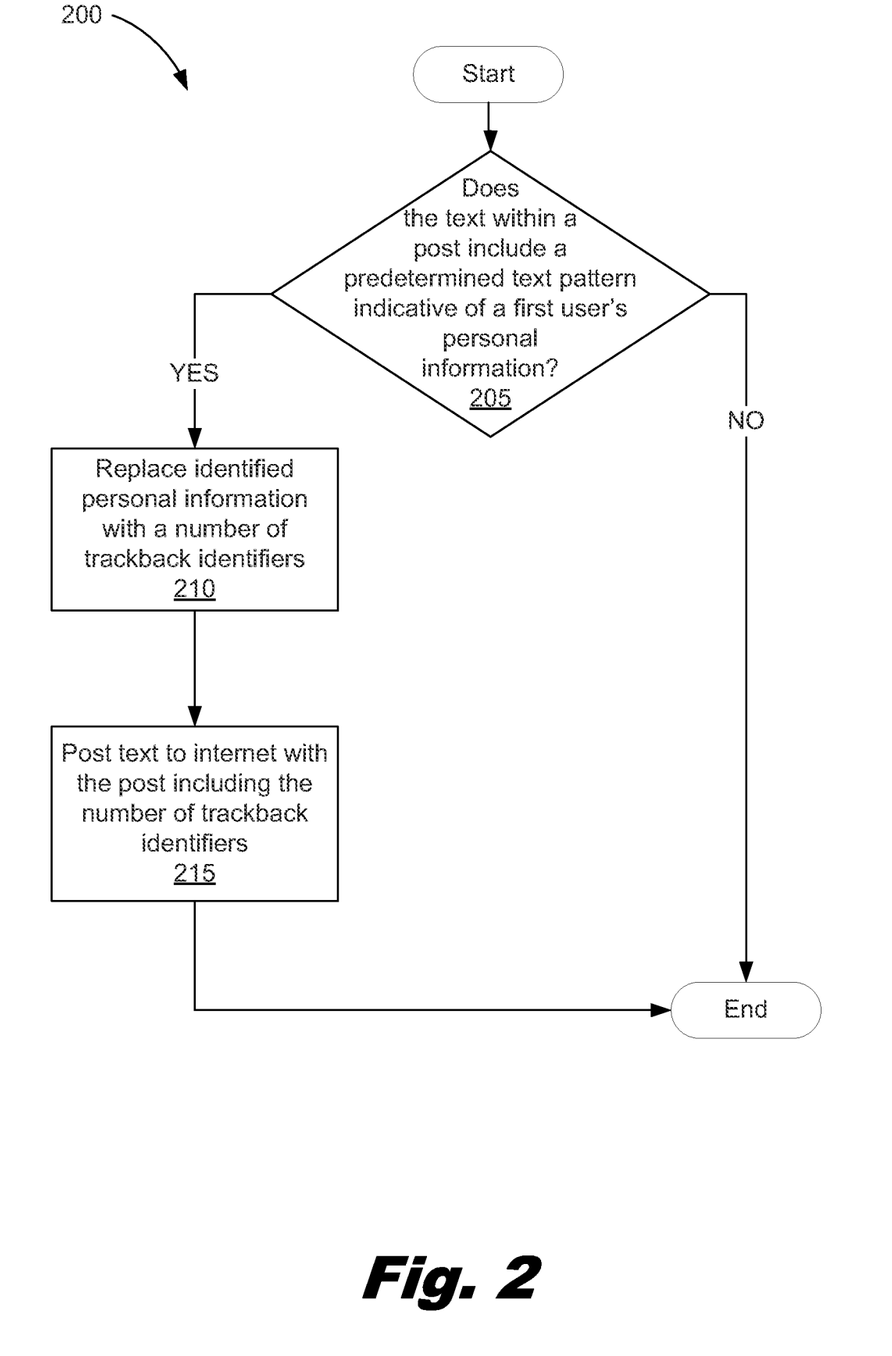
FIG. 2 is a flowchart showing a method of preventing personal information from being posted to a website according to one example of principles described herein.

FIG. 2 is a flowchart showing a method (200) of preventing personal information from being posted to a website according to one example of principles described herein. The method may begin with determining (205) whether the text within a post includes a predetermined text pattern. As briefly discussed above the predetermined pattern in the text may include a series of letters and numbers that define a telephone number, a physical address, internet address, a social security number, or even a uniform resource locator.

If the system (100) determines (205) that the text does not include a predetermined text pattern (No decision, 205) the process ends and the text is posted to the intended website on the Internet. When the system (100) determines that the text within a post includes a predetermined text pattern (Yes determination, 205), then the trackback generation module (125) replaces (210) the identified text with trackback identifier. After the identified text has been replaced (210) with the trackback identifier, the system (100) may post (215) the text to the website with the text now including the trackback identifier.

Although the system and method described above were described as being implemented on a server (105), the system (100) and method (200) may be implemented within other various systems. For example, the discovery module (120) and trackback generation module (125) may be implemented on a social networking site as a feature of that site. Therefore, the discovery module (120) and trackback generation module (125) may be saved and implemented on a server associated with that social networking site. Other similar examples exist with the discovery module (120) and trackback generation module (125) being saved to and used by other various types of servers for other types of services.

Additionally, in another example, the discovery module (120) and trackback generation module (125) may be saved on a personal computer of a user of the Internet. In this example, the personal computer may perform the method described above in FIG. 2, using the discovery module (120) and trackback generation module (125) to determine (205) whether predetermined text pattern exists in the text, and replace (210) that text with the trackback text before posting (215) the text to any website. In one example, the trackback text may be an active link where, upon clicking on it, the system executes a trackback function as will be described below.

Still further, the system and method may be implemented on a network where one user of the network may limit other users from posting his or her information. Some websites such as social networking websites allow a user to create groups or networks of contacts that he or she would like to internet with. These groups may be limited to only those people that either a single user or the group as a whole may wish to be included. In some examples, requests may be made by persons outside and inside the group requesting that another user be included in that group. This provides for a dynamic and ever changing network of users. In one example, the system (100) may recognize that a first user has a predetermined list of other users within his or her network. The system may then allow that first user to determine how he or she would want his or her information shared with the group.

For example, the system (100) may allow a first user to prevent any other user from reposting personal information about him or her outside of the group and onto another website on the Internet. If one of the other users were to attempt to do this, the system may cause any personal information taken from a post via, for example, a copy and paste procedure be detected and replaced with trackback identifier as described in the method of FIG. 2. Therefore, the first user truly control the dissemination of his or her information even when the genesis of that information in a post, for example, is not the first user.

Additionally, the system (100) may provide more specific control by a first user on how his or her personal information is shared on the social networking site. For example, the system may provide a first user with the ability to prevent other users from posting the first user's personal information to other users of the social networking site who are not members of the first user's group. In this example, the system (100) determines (205) if the text being posted contains a predetermined text pattern, and replace (210) that information with the trackback identifier if the first user's settings prevent other users of the social network site from posting his information. Therefore, in this example, the first user may securely register with the social networking site a list of information that may be cross referenced before a the first user's information may be made available to those user's outside of the first user's network.

Still further, the system (100) may allow a first user to determine which users may see specific pieces of personal information on the social networking site. For example, the first user may not wish for anyone on the social networking site to be able to see his or her social security information. Therefore, when, for example, a human resource representative posts to the social networking site the first user's social security number, no individual is able to see the social security number and instead sees a trackback identifier replacing the number. An affirmative confirmation from the first user allows any one individual user to view that information. In another example, the first user may prevent specific users outside and inside the network from seeing, for example, his or her telephone number. In this way, a user may control not only an accidental divulging of his or her personal information himself, but also prevent others from divulging that personal information when the first user may not want it to be divulged.

The trackback identifier may come in the form of various types of text and links that a third-party user may be referred to. In one example, if the text is a URL, the system (100) may insert a custom trackback identifier presented in the form of a proxy URL. For example, if a first user posts a second user's personal blog address to the Internet, the system may cause a third-party user may see a URL such as http://seconduser.com/proxy/123. The second user's personal information, i.e. the intent address to his or hers blog, may be kept private from all third-party users due to the second user's privacy settings on the system (100). The third party user may then click on the trackback identifier presented in the form of a URL and may be directed to another site apart from the second user's blog. A confirmation process is then initiated. This site may send a notice to the second user that a third-party has been identified as wanting to obtain the internet address to the second user's personal blog. The second user may then choose whether or not to allow such access thereby giving the second user complete control over the release of this personal information. In this example, additional log on information may also be presented to the third-party user along with the release of the second user's information. In one example, an additional notice may be sent to the system (100) notifying the system (100) that the identified third-party is now allowed access to at least the internet address of the second user's personal blog.

In another example similar to that above, if the text is a physical home address of a first user, any display of that address on a post by any user of the system (100) may result in a trackback identifier in the form of a URL replacing that text. A confirmation process may then be initiated where if a third-party user selects the URL, confirmation will first be received from the first user before that information is displayed to the third-party in the post.

In yet another example, if the identified text is an email address, then the email address is replaced with a trackback identifier in the form of a proxy email address such as user-123456@exampledomain.com. A custom subject communication may be presented to a first user, the first user being the user associated with that email address. The proxy email sent to the first user may introduce a number of other users of the system (100) to the first user. Due to the introduction of the first user to the other uses of the system (100), the email sent to the first user may also include options or links for the first user to include these other users into his or her network. Using the system (100) therefore allows a third party to communicate with the first user without the first user's email address actually being made public. The first user may choose whether or not to address the sent emails to him or her. A junk mail service may also be used should the first user like to ignore any other entails containing the trackback entail. Even further, the first user may, through the email sent to him or her, learn how the third-party had obtained the proxy email such as for example which social networking site and which user first posted the first user's email to the Internet. A chain of previous posters may also be presented to the first user when the post has been reposted a number of times.

In still another example, if the identified text is a phone number, then the phone number is replaced with a trackback identifier in the form of a proxy phone number and identification number such as 1-800-MY-PROXY #123456789. A third-party user may be allowed to dial the phone number, type in the identification number to reach the first user. The first user may further use a caller id system which allows the first user to view not only the caller name and number, but also the information associated with where on the internet the proxy number was obtained. Through this method a first user may control if, how, when, and in what manner his or her personal information is posted to the internet.

The examples provided above in connection with the types of personal information that can be posted to the internet as well as the methods in which the system (100) handles the replacing of this information are all merely examples. Other types of personal information may be monitored by the system (100). Additionally, the method in which the system (100) handles the replacement and redirection of third-parties may vary depending on the both the type of information posted as well as the owner's security settings. For example, instead of using a confirmation process whenever a second user posts a URL address associated with a first user's personal information, the first user or system (100) may choose to not allow a third-party outside of the first user's network to even access the proxy URL.

In some examples described above, the system (100) may further allow a trackback identifier to expire after a predetermined amount of time from when it was initially posted. In one example, the predetermined amount of time may be varied based on a user's personal settings. In another example, the system (100) may set the predetermined expiration time.

Figure 3A:
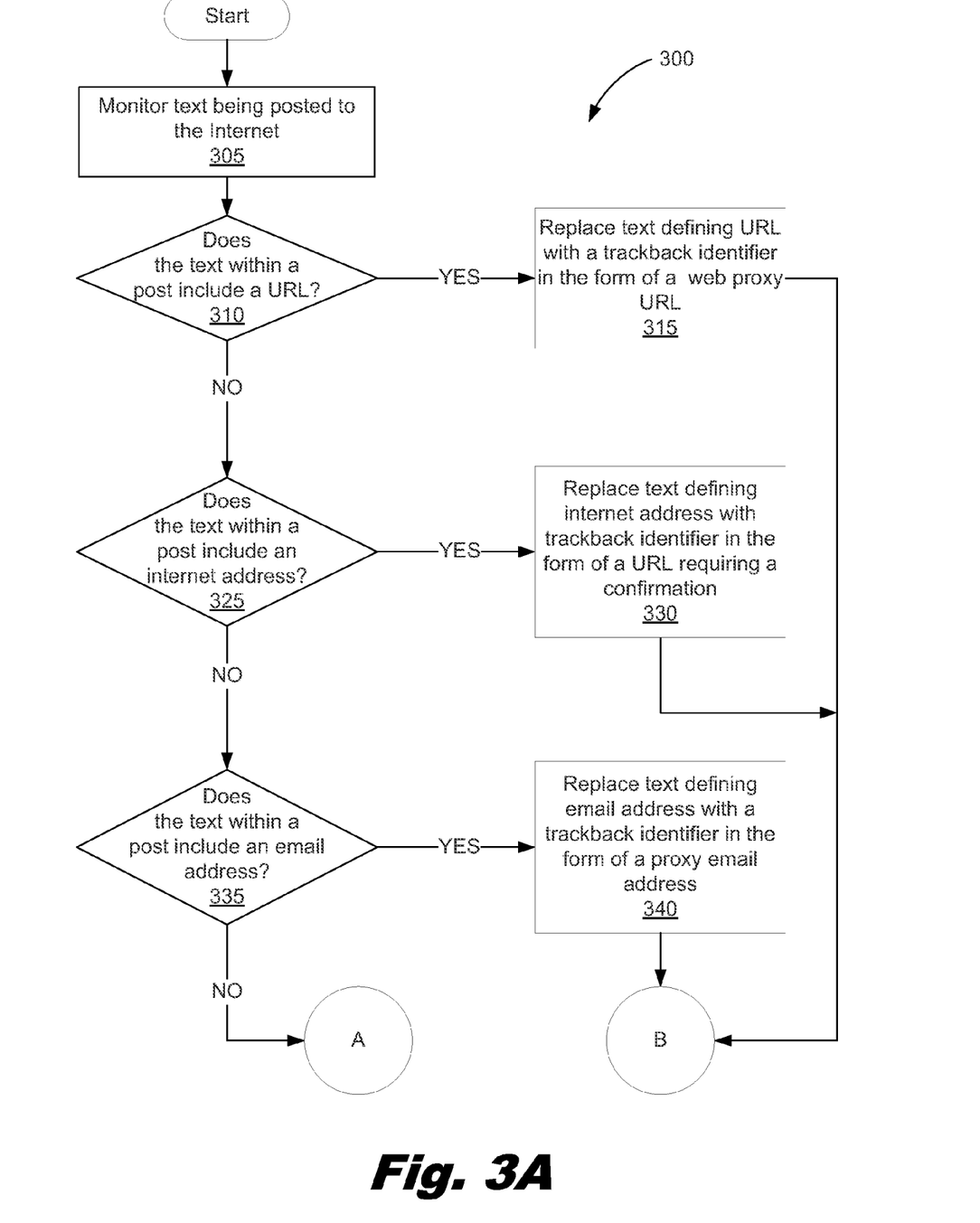
FIGS. 3A and 3B together form a flowchart showing another method of preventing personal information from being posted to a website according to one example of principles described herein.
Figure 3B:
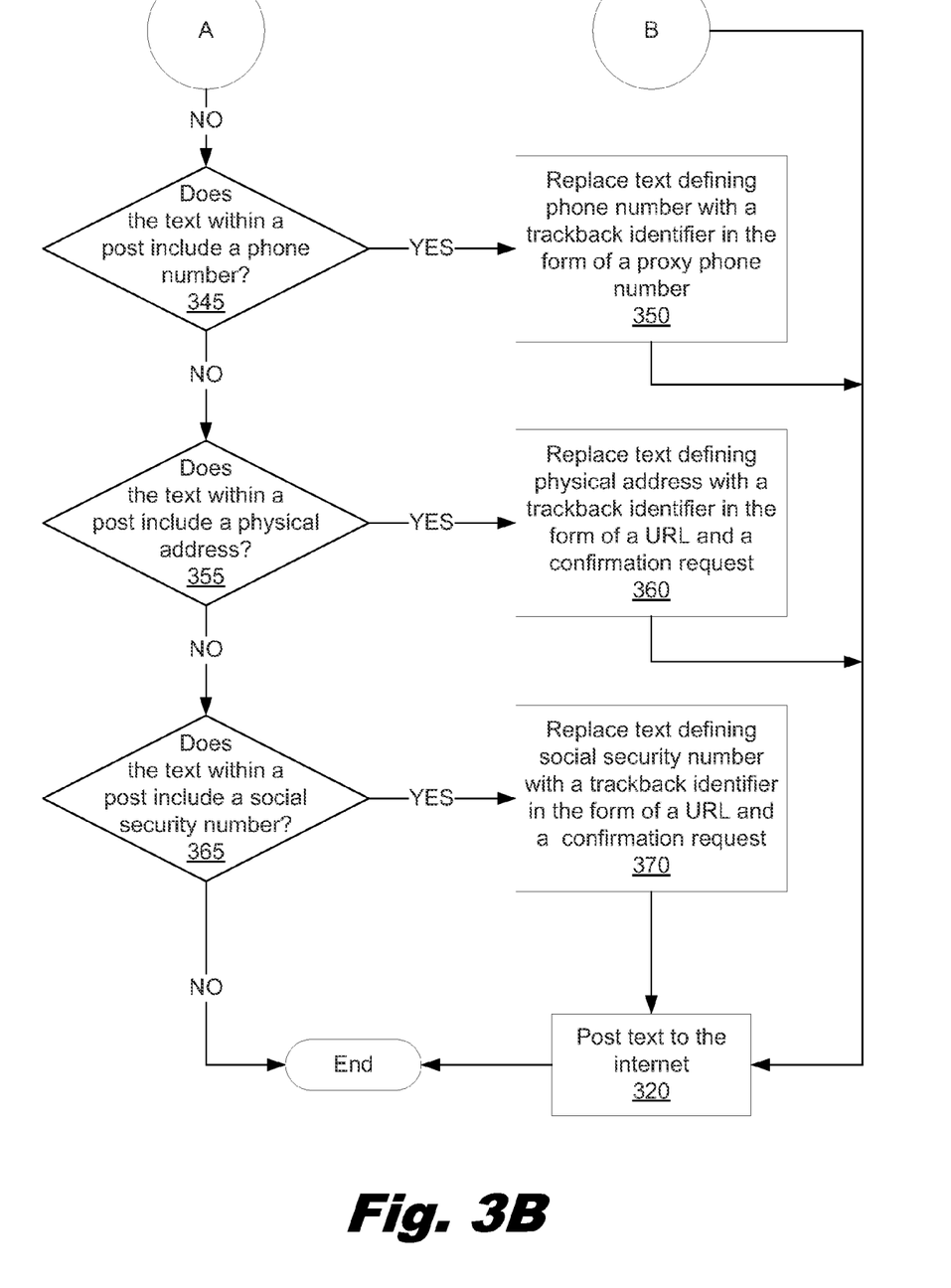

FIGS. 3A and 3B together form a flowchart showing another method of preventing personal information from being posted to a website according to one example of principles described herein. The method may begin with the system (100) monitoring (305) text being posted to the internet. The system (100) may then begin to go through a number of searches through the text to determine if specific types of text exist within the text. For example, the system (100) may determine (310) if the text within the post includes a URL. If the text does include a URL (Yes determination, 310), then the system may check to see if the URL is a URL that is subjected to any users' security settings. As discussed above the system (100) may refer to a list of URLs and other personal data to which the users of the network have placed posting restrictions on. If the URL is subjected to a number of restrictions based on a number of users' security settings, then the system (100) may replace (315) the text defining the URL with a trackback identifier in the form of a web proxy URL. After the text has been replaced (315), then the flowchart moves on to FIG. 3B via circle "B" and the system (100) may allow the text to be posted to the internet (320, FIG. 3B) provided other types of restricted text are not found within the text.

If the text does not contain a URL (NO determination, 310) then the system may continue on to determine (325) if the text with the post includes an internet address. If the text does include an internet address (Yes determination, 325), then the system (100) may check to see if the internet address is an internet address that is subjected to any users' security settings. If the internet address is subjected to a number of restrictions based on a number of users' security settings, then the system (100) may replace (330) the text defining the internet address with a trackback identifier in the form of URL and request confirmation from the owner of the personal information. After the text has been replaced (330), then the flowchart moves on to FIG. 3B via circle "B" and the system (100) may allow the text to be posted to the internet (320, FIG. 3B) provided other types of restricted text are not found within the text.

If the text does not contain an internet address (NO determination, 325) then the system may continue on to determine (335) if the text with the post includes an email address. If the text does include an email address (Yes determination, 335), then the system (100) may check to see if the email address is an email address that is subjected to any users' security settings. If the email address is subjected to a number of restrictions based on a number of users' security settings, then the system (100) may replace (340) the text defining the email address with a trackback identifier in the form of a proxy email address. After the text has been replaced (340), then the flowchart moves on to FIG. 3B via circle "B" and the system (100) may allow the text to be posted to the internet (320, FIG. 3B) provided other types of restricted text are not found within the text.

If the text does not contain an email address (NO determination, 335) then the flowchart moves on to FIG. 3B via circle "A" and the system may continue on to determine (345) if the text with the post includes a phone number. If the text does include a phone number (Yes determination, 345), then the system (100) may check to see if the phone number is a phone number that is subjected to any users' security settings. If the phone number is subjected to a number of restrictions based on a number of users' security settings, then the system (100) may replace (350) the text defining the phone number with a trackback identifier in the form of a proxy phone number. After the text has been replaced (350), the system (100) may allow the text to be posted to the internet (320, FIG. 3B) provided other types of restricted text are not found within the text.

If the text does not contain a phone number (NO determination, 345) then the system (100) may continue on to determine (355) if the text with the post includes a physical address. If the text does include a physical address (Yes determination, 355), then the system (100) may check to see if the physical address is a physical address that is subjected to any users' security settings. If the physical address is subjected to a number of restrictions based on a number of users' security settings, then the system (100) may replace (360) the text defining the physical address with a trackback identifier in the form of a URL requiring a confirmation from the owner of this personal information. After the text has been replaced (350), the system (100) may allow the text to be posted to the internet (320, FIG. 3B) provided other types of restricted text are not found within the text.

If the text does not contain a physical address (NO determination, 355) then the system (100) may continue on to determine (365) if the text with the post includes a social security number. If the text does include a social security number (Yes determination, 365), then the system (100) may check to see if the social security number is a social security number that is subjected to any users' security settings. If the social security number is subjected to a number of restrictions based on a number of users' security settings, then the system (100) may replace (370) the text defining the social security number with a trackback identifier in the form of URL requiring a confirmation from the owner of this personal information. After the text has been replaced (370), the system (100) may allow the text to be posted to the internet (320, FIG. 3B) provided other types of restricted text are not found within the text. After the text has been searched for any protected or secure personal information (310, 325, 335, 345, 355, 360) and replaced (315, 330, 340, 350, 360, 370), where applicable, with their respective trackback identifiers, then the process continue with the text being posted (320) to the internet and the process may end.

Figure 4:
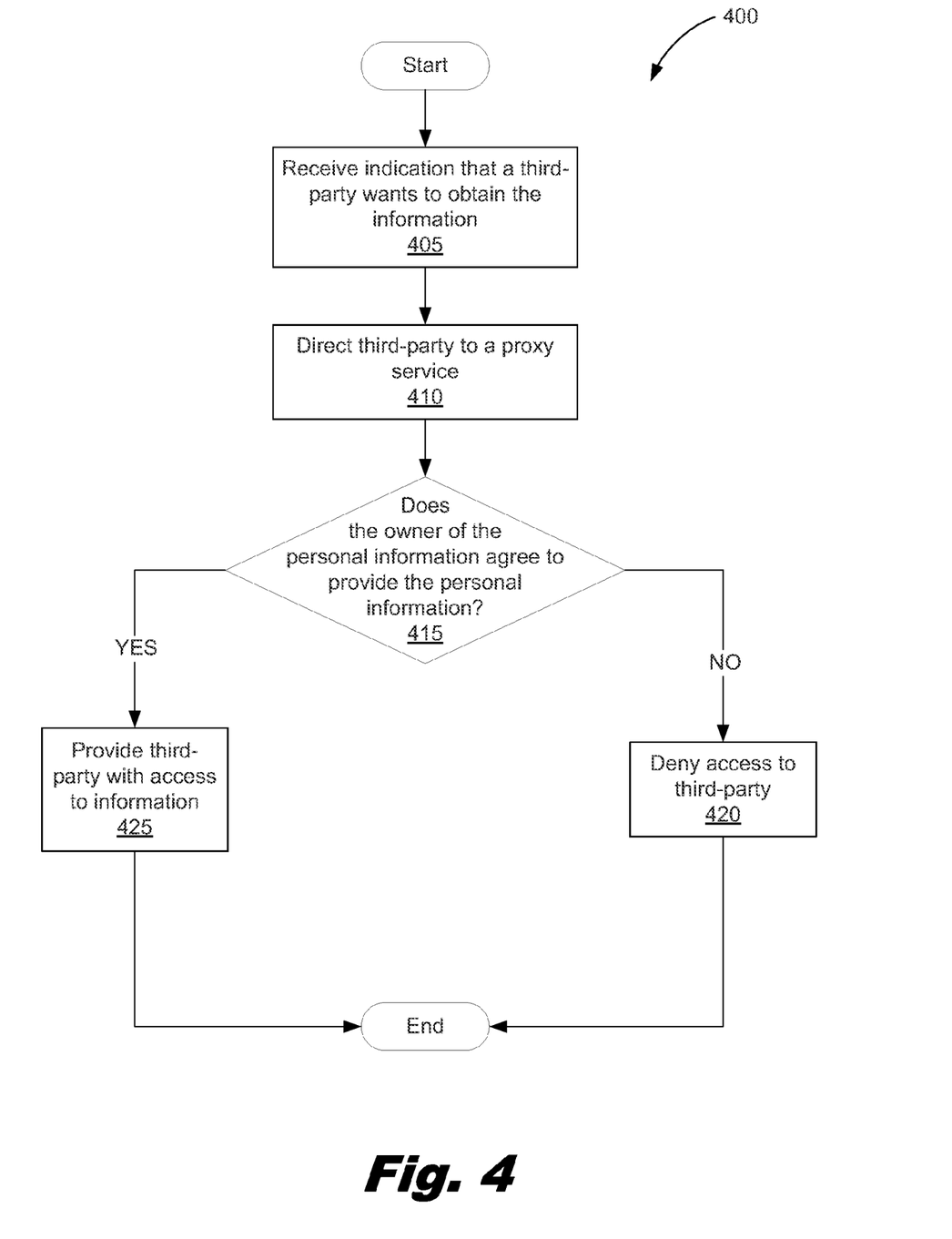
FIG. 4 is a flowchart showing a method of providing a confirmation to allow a third-party user access to another user's personal information according to one example of principles described herein.

FIG. 4 is a flowchart showing a method of providing a confirmation to allow a third-party user access to another user's personal information according to one example of principles described herein. As described above, after the system (100) has identified that certain personal information is included within text that is to be posted to the internet, the system may replace that identified text with a trackback identifier which, in some examples, provides a way in which the user may obtain the personal information upon authorization by the owner of the personal information in a confirmation process. The confirmation process may begin with a third-party user, i.e. a person who wishes to obtain that personal information, selecting the link or otherwise notifying the system (100). The system (100) receives (405) an indication that the third-party user wants to obtain the information. The indication may come in the form of a URL redirection request, a phone call, or other types of actions. Once the system (100) receives (405) the indication, the system (100) may direct (410) the third-party user to a proxy service. For example, when a third-party user selects a URL link with the post that is a trackback identifier appearing in the form of a proxy URL, then the system (100) may redirect (410) the third-party user to a separate website which may allow the third-party user to request this information. In another example, the trackback identifier may be in the form of a proxy phone number which, upon of a third-party dialing the number and entering a unique identification number may direct (410) the third-party to the phone line of the owner of the personal information. At this point, the owner of the personal information may choose not to provide the information to the third-party (No determination, 415). If this is the case, the system (100) may deny access to the third-party user and the process may end. In one example, the third-party may receive a notification that they have been denied access.

If the owner of the personal information, i.e. a first user, chooses to provide the information to the third-party (Yes determination, 415), then the third-party user is provided (425) with the information and the process may end. Following the examples presented above, if the first user wishes that the third-party user to receive the URL address to, for example, his or her personal blog (Yes determination, 415), then the first user may indicate to the system (100) such a request and the system (100) will provide the third-party user with the URL. In another example, if the personal information was a phone number, the first user may pick up the phone call from the third-party user, have a discussion verbally over the phone, and choose at that time whether or not to share his or her phone number with the third-party user. If the first user does not wish to share this information, then the system (100) provided a way in which a third-party user may connect with the first user but still prevent the exact phone number from being revealed to the third-party user as well as the rest of the viewers of the post. As discussed above, the trackback identifier may be used for a predetermined amount of time frame in which, upon expiration of that time frame, the proxy phone number and corresponding identification number no longer serves as a way to connect to the first user.

As discussed above the present system and method may be implemented on a computer program product. Therefore, the present specification describes a computer program product for preventing personal information from being posted to the Internet. The computer program product may comprise, a computer readable storage medium having computer usable program code embodied therewith, the computer usable program code comprising, computer usable program code to, when executed by a processor, determine whether the text within a post includes a predetermined text pattern indicative of a user's personal information. The computer usable program code may further comprise computer usable program code to, when executed by a processor, replace any identified personal information with a number of trackback identifiers. Additionally, the computer usable program code may further comprise computer usable program code to, when executed by a processor, post the text to the website with the post including the number of trackback identifiers.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The specification and figures describe a system and method of preventing personal information from being posted to an internet. The system and method may use a trackback identifier to allow a third-party user of the system to, at least, request the personal data of an owner of the personal information or contact that person when desired. This system and method of preventing personal information from being posted to an internet may have a number of advantages, including: allowing the third-party user to contact the owner of the personal information without disclosing to every user of the internet specific personal information which may financially or socially compromise the owner of the personal information. Still further, the system and method allows any first user to have complete control over his or her personal information by preventing other users from posting the first user's information without the first user's knowledge. The system and method further provides for a first user to receive a confirmation request thereby allowing the first user to decide if he or she wants to share the personal information to the requesting third-party user. Still further, the system and method allows any single user to set specific security settings through which he or she may decide beforehand who among the number of other users is allowed to view, via the internet, that user's personal information. The system may allow some users to see the information while simultaneously preventing other users from viewing the personal information and instead replace that information with a trackback identifier.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of preventing personal information from being posted to an internet, comprising:
    determining whether text within a post includes a pre-identified text pattern indicative of a first user's personal information;
    replacing any identified personal information with a number of trackback identifiers, the trackback identifiers comprising an active link comprising text different from the personal information and wherein the active link, when actuated, submits to a proxy service a request for the identified personal information and prevents attainment of the personal information until permission to provide the personal information is received;
    posting the text to the internet with the post including the number of trackback identifiers; and
    causing the trackback identifier to expire after a predetermined amount of time from when the trackback identifiers were posted based on settings provided by the first user.

2. The method of claim 1, in which the method further comprises referencing a list of personal data associated with the first user to determine whether the first user has restricted the personal information from being posted to the internet;
    in which, if the first user has indicated that the personal information should not be posted to the internet, the method further comprises replacing any identified personal information with the number of trackback identifiers.

3. The method of claim 1, in which the personal information is a social security number, a phone number, a uniform resource locator, an internet address, an email address, a physical address, a phone number, an insurance number, or combinations thereof.

4. The method claim 3, in which, if the personal information is a URL, the URL is replaced with a trackback identifier in the form of a proxy URL.

5. The method of claim 3, in which, if the personal information is a telephone number, the telephone number is replaced with a trackback identifier in the form of a proxy telephone number and corresponding identification number.

6. The method of claim 5, in which, if a second user calls the proxy telephone number and enters in the corresponding identification number, the first user is notified that the second user has obtained the proxy telephone number from the post.

7. The method of claim 3, in which, if the personal information is an email address, the email address is replaced with a trackback identifier in the form of a proxy email address.

8. The method of claim 7, in which the proxy email address, when selected by a second user, introduces the first user to the second user through a custom email to the first user.

9. The method of claim 1, in which actuation of a trackback identifier of the number of trackback identifiers by a second user directs the second user to a proxy service.

10. The method of claim 9, in which the proxy service presents to the first user a choice to allow or disallow the second user from obtaining the personal information.

11. A system for replacing personal information in an internet post on a social networking site with a number of trackback identifiers, the system comprising:
    a processor;
    a discovery module; and
    a trackback generation module;
    in which the discovery module, when executed on the processor, searches through text within a post intended to be posted by a first user on the social networking site for any personal information associated with the first user;
    in which the discovery module, when executed by the processor, further receives a list of contacts from the first user indicating which contacts are allowed to view the personal information on the social networking site and treats all other non-contact users on the social networking site as users restricted from viewing the personal information;
    in which the trackback generation module, when executed on the processor, replaces, for all non-contacts, any identified personal information with the number of trackback identifiers before the information is posted to the social networking site; and
    in which the trackback generation module detects a sharing action of the post by a contact to a non-contact and, replaces any identified personal information with the number of trackback identifiers before the information is shared with the non-contact.

12. The system of claim 11, in which the discovery module compares searched text within the post to a list of personal data associated with the first user to determine whether the first user has restricted the personal information from being posted to the internet;
    in which, if the first user has indicated that the personal information should not be posted to the internet, the discovery module replaces any identified personal information with the number of trackback identifiers.

13. The system of claim 12, in which the personal information is a social security number, a phone number, a uniform resource locator, an internet address, an email address, a physical address, a phone number, an insurance number, or combinations thereof.

14. The system of claim 13, in which, if the personal information is a URL, the trackback generation module replaces the URL with a trackback identifier in the form of a proxy URL.

15. The system of claim 13, in which, if the personal information is a telephone number, the trackback generation module replaces the telephone number with a trackback identifier in the form of a proxy telephone number and corresponding identification number.

16. The system of claim 15, in which, if a second user calls the proxy telephone number and enters in the corresponding identification number, the first user is notified that the second user has obtained the proxy telephone number from the post.

17. The system of claim 13, in which, if the personal information is an email address, the trackback generation module replaces the email address with a trackback identifier in the form of a proxy email address.

18. The system of claim 17, in which the proxy email address, when selected by a second user, introduces the first user to the second user through a custom email to the first user.

19. The system of claim 11, in which selection of a trackback identifier of the number of trackback identifiers by a second user directs the second user to a proxy service in which the first user is given a choice to allow or disallow the second user from obtaining the personal information.

20. A computer program product for preventing personal information from being posted to the internet, the computer program product comprising:

a computer readable storage medium having computer usable program code embodied therewith, the computer usable program code comprising:

computer usable program code to, when executed by a processor, determine whether the text within a post includes a predetermined text pattern indicative of a user's personal information;

computer usable program code to, when executed by a processor, replace any identified personal information with a number of trackback identifiers;

computer usable program code to, when executed by a processor, post the text to the web site with the post including the number of trackback identifiers; and         computer usable program code to, when executed by a processor, cause the trackback identifiers to expire after a predetermined amount of time from the original posting of each trackback identifier; the predetermined amount of time being based on a setting set by the first user;

computer usable program code to, when executed by a processor, select a trackback identifier of the number of trackback identifiers to direct a second user to a proxy service: and         computer usable program code to, when executed by a processor, present to the first user a choice to allow or disallow the second user from obtaining the personal information;

wherein the presentation of the personal information to the second user is allowed when it is determined that the second user is a contact associated with the first user on a social networking site and wherein, when the second user is a contact associated with the first user on a social networking site, the first user is presented with the option to limit any viewable personal information to specific types of personal information.

\* \* \* \* \*